(12) United States Patent
Dave et al.

(10) Patent No.: US 11,868,490 B2
(45) Date of Patent: *Jan. 9, 2024

(54) DEVICE AND METHODS FOR MANAGEMENT AND ACCESS OF DISTRIBUTED DATA SOURCES

(71) Applicant: Intel Corporation, Santa Clara, CA (US)

(72) Inventors: Manish Dave, Folsom, CA (US); Vishwa Hassan, Chandler, AZ (US); Bhaskar D. Gowda, Hillsboro, OR (US); Mrigank Shekhar, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,486

(22) Filed: May 24, 2022

(65) Prior Publication Data

US 2022/0358229 A1 Nov. 10, 2022

Related U.S. Application Data

(63) Continuation of application No. 16/922,680, filed on Jul. 7, 2020, now Pat. No. 11,354,429, which is a (Continued)

(51) Int. Cl.
*G06F 21/60* (2013.01)
*H04L 9/40* (2022.01)
*H04L 67/10* (2022.01)

(52) U.S. Cl.
CPC ........ *G06F 21/604* (2013.01); *H04L 63/0884* (2013.01); *H04L 67/10* (2013.01)

(58) Field of Classification Search
CPC ..... H04L 63/08; H04L 63/10; H04L 63/0876; H04L 63/126; G06F 21/31; G06F 21/00; G06F 17/30893; G06F 21/78
See application file for complete search history.

(56) References Cited

U.S. PATENT DOCUMENTS 9,507,949 B2 11/2016 Dave et al.
10,706,162 B2 7/2020 Dave et al.
(Continued)

OTHER PUBLICATIONS

"Cloud Computing," Wikipedia, retrieved from http://en.wikipedia.org/w/index.php?title=Cloud_computing&oldid=487761996, edited Apr. 17, 2012, 10 pages.
(Continued)

*Primary Examiner* — Mohammed Waliullah
(74) *Attorney, Agent, or Firm* — Hanley, Flight & Zimmerman, LLC

(57) ABSTRACT

A device and method for provided access to distributed data sources includes a cloud security server configured to associate any number of data sources and client devices with a cloud security server account. The cloud security server assigns trust levels to the data sources and the client devices. A client device requests data from the cloud security server. The cloud security server authenticates the client device and verifies the trust levels of the client device and the requested data. If verified, the cloud security server brokers a connection between the client device and the data source, and the client device accesses the requested data. Data sources may include cloud service providers and local storage devices. The cloud security server may assign a trust level to a client device for a limited time or revoke a trust level assigned to a client device. Other embodiments are described and claimed.

26 Claims, 6 Drawing Sheets

Related U.S. Application Data continuation of application No. 15/363,157, filed on Nov. 29, 2016, now Pat. No. 10,706,162, which is a continuation of application No. 13/631,453, filed on Sep. 28, 2012, now Pat. No. 9,507,949.

(56) References Cited

U.S. PATENT DOCUMENTS

| | | | |
|---|---|---|---|
| 11,354,429 B2 | 6/2022 | Dave et al. | |
| 2009/0113523 A1* | 4/2009 | Vedula | H04L 63/0815 726/4 |
| 2009/0254572 A1* | 10/2009 | Redlich | G06Q 10/06 |
| 2011/0004943 A1* | 1/2011 | Chaganti | H04L 29/06 726/30 |
| 2012/0054826 A1 | 3/2012 | Asim | |
| 2012/0239950 A1* | 9/2012 | Davis | H04W 12/06 713/320 |
| 2012/0331522 A1* | 12/2012 | Park | G06F 9/45533 726/3 |
| 2013/0007629 A1* | 1/2013 | Dani | G06F 3/0482 715/744 |
| 2013/0073939 A1* | 3/2013 | Honsowetz | G06F 17/246 715/212 |
| 2013/0073940 A1 | 3/2013 | Honsowetz | |
| 2013/0086650 A1* | 4/2013 | Soundrapandian | H04L 63/0428 726/5 |
| 2013/0263185 A1 | 10/2013 | Wood | |
| 2013/0291068 A1* | 10/2013 | Huang | G06F 9/5072 726/4 |
| 2013/0332358 A1* | 12/2013 | Zhao | G06Q 20/12 705/44 |
| 2013/0346236 A1* | 12/2013 | Fung | G06Q 20/29 705/26.8 |
| 2014/0020072 A1* | 1/2014 | Thomas | H04L 63/0815 726/7 |
| 2014/0250500 A1* | 9/2014 | Lee | G06F 21/32 726/4 |

OTHER PUBLICATIONS

The United States Patent and Trademark Office, "Non-Final Rejection," issued in connection with U.S. Appl. No. 15/363,157, dated Sep. 14, 2017, 20 pages.

United States Patent and Trademark Office, "Non-Final Rejection," issued in connection with U.S. Appl. No. 13/631,453, dated Mar. 24, 2016, 29 pages.

The United States Patent and Trademark Office, "Final Rejection," issued in connection with U.S. Appl. No. 15/363,157, dated Dec. 16, 2019, 14 pages.

United States Patent and Trademark Office, "Notice of Allowance and Fee(s) Due," issued in connection with U.S. Appl. No. 16/922,680, dated Feb. 9, 2022, 8 pages.

The United States Patent and Trademark Office, "Notice of Allowance and Fee(s) Due," issued in connection with U.S. Appl. No. 15/363,157, dated Mar. 25, 2020, 8 pages.

The United States Patent and Trademark Office, "Advisory Action," issued in connection with U.S. Appl. No. 15/363,157, dated Jul. 23, 2018, 3 pages.

United States Patent and Trademark Office, "Non-Final Rejection," issued in connection with U.S. Appl. No. 13/631,453, dated Feb. 6, 2014, 17 pages.

The United States Patent and Trademark Office, "Final Rejection," issued in connection with U.S. Appl. No. 15/363,157, dated Mar. 8, 2018, 11 pages.

The United States Patent and Trademark Office, "Non-Final Rejection," issued in connection with U.S. Appl. No. 15/363,157, dated Nov. 1, 2018, 10 pages.

"Cloud Storage," Wikipedia, retrieved from http://en.wikipedia.org/w/index.php?title=Cloud_storage&oldid=486347196, edited Apr. 9, 2012, 4 pages.

"Cloud Storage Gateway," Wikipedia, retrieved from http://en.wikipedia.org/w/index.php?title=cloud_storage_gateway&oldid=484422424, edited Mar. 28, 2012, 1 page.

United States Patent and Trademark Office, "Notice of Allowance and Fee(s) Due," issued in connection with U.S. Appl. No. 13/631,453, dated Jul. 21, 2016, 17 pages.

United States Patent and Trademark Office, "Advisory Action," issued in connection with U.S. Appl. No. 13/631,453, dated Oct. 20, 2014, 3 pages.

The United States Patent and Trademark Office, "Advisory Action," issued in connection with U.S. Appl. No. 15/363,157, dated Jul. 3, 2019, 3 pages.

"Distributed Data Store," Wikipedia, retrieved from http://en.wikipedia.org/w/index.php?title=Distributed_Data_Store&oldid=485131637, edited Apr. 2, 2012, 3 pages.

United States Patent and Trademark Office, "Non-final Rejection," issued in connection with U.S. Appl. No. 16/922,680, dated Oct. 7, 2021, 6 pages.

"Cloud Computing Security," Wikipedia, retrieved from http://en.wikipedia.org/w/index.php?title=Cloud_computing_security&oldid=486759288, edited Apr. 11, 2012, 4 pages.

United States Patent and Trademark Office, "Final Rejection," issued in connection with U.S. Appl. No. 13/631,453, dated Sep. 8, 2015, 30 pages.

United States Patent and Trademark Office, "Non-Final Rejection," issued in connection with U.S. Appl. No. 13/631,453, dated May 19, 2015, 23 pages.

The United States Patent and Trademark Office, "Non-Final Rejection," issued in connection with U.S. Appl. No. 15/363,157, dated Aug. 21, 2019, 13 pages.

"Apache Hadoop," Wikipedia, retrieved from http://en.wikipedia.org/w/index.php?title=Apache_Hadoop&oldid=487184560, edited Apr. 13, 2012, 11 pages.

The United States Patent and Trademark Office, "Final Rejection," issued in connection with U.S. Appl. No. 15/363,157, dated Apr. 5, 2019, 13 pages.

United States Patent and Trademark Office, "Final Rejection," issued in connection with U.S. Appl. No. 13/631,453, dated May 21, 2014, 24 pages.

United States Patent and Trademark Office, "Advisory Action," issued in connection with U.S. Appl. No. 13/631,453, dated Feb. 3, 2016, 24 pages.

\* cited by examiner

DEVICE AND METHODS FOR MANAGEMENT AND ACCESS OF DISTRIBUTED DATA SOURCES

RELATED APPLICATIONS

This patent arises from a continuation of U.S. patent application Ser. No. 16/922,680, filed Jul. 7, 2020, entitled "DEVICE AND METHODS FOR MANAGEMENT AND ACCESS OF DISTRIBUTED DATA SOURCES," which is a continuation of U.S. patent application Ser. No. 15/363,157 (U.S. Pat. No. 10,706,162), filed Nov. 29, 2016, entitled "DEVICE AND METHODS FOR MANAGEMENT AND ACCESS OF DISTRIBUTED DATA SOURCES," which is a continuation of U.S. patent application Ser. No. 13/631,453 (U.S. Pat. No. 9,507,949), filed Sep. 28, 2012, entitled, "DEVICE AND METHODS FOR MANAGEMENT AND ACCESS OF DISTRIBUTED DATA SOURCES." U.S. patent application Ser. No. 16/922,680, U.S. patent application Ser. No. 15/363,157 and U.S. patent application Ser. No. 13/631,453 are hereby incorporated by reference. Priority to U.S. patent application Ser. No. 16/922,680, U.S. patent application Ser. No. 15/363,157 and U.S. patent application Ser. No. 13/631,453 is hereby claimed.

BACKGROUND

Computing devices store ever-increasing amounts of digital data, such as documents, pictures, music, and movies. Digital data is increasingly being stored in "the cloud," that is, stored in distributed data sources accessible over a ubiquitous network like the Internet. For example, some cloud services provide general-purpose networked data storage. Other cloud services provide networked access to specialized data storage, such as music libraries. Data stored by cloud services may be private (e.g., accessible only to a data owner), may be public, or may have an intermediate level of allowed access. A data owner may maintain several such cloud data stores across several different cloud service providers. Each cloud service provider generally has its own authentication system and security model.

While networked data sources are increasingly common, local storage devices like memory cards and disk drives continue to store much—or most—digital data. Data stored in local storage devices is generally not accessible beyond a local network.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
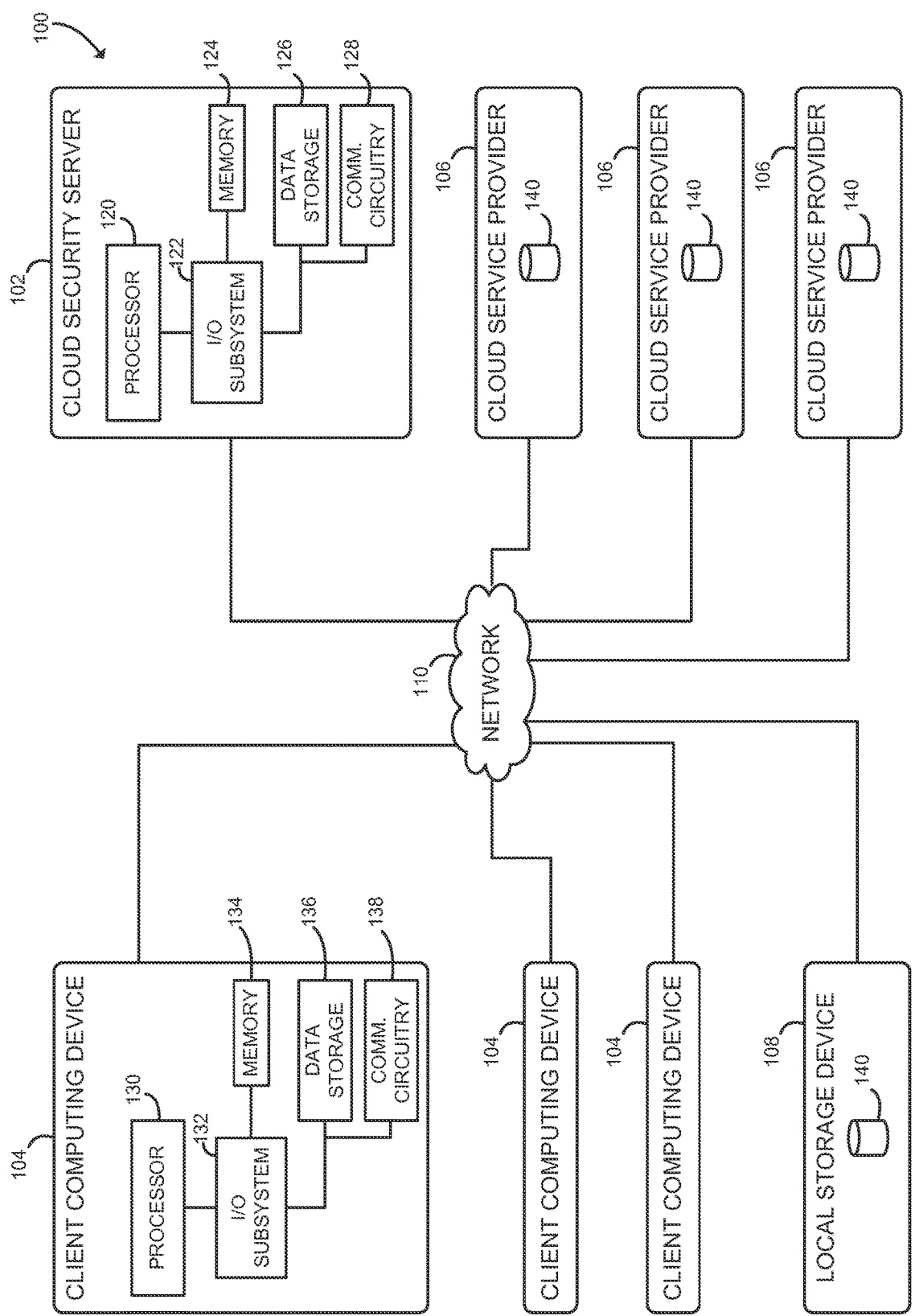
FIG. 1 is a simplified block diagram of at least one embodiment of a system for managing and accessing distributed data sources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for managing and accessing distributed data sources includes a cloud security server 102, a plurality of client computing devices 104, a plurality of cloud service providers 106, and a local storage device 108, all in communication with each other over a network 110. In use, as discussed in more detail below, the cloud security server 102 is configured to associate a plurality of trust levels to the client computing devices 104, the cloud service providers 106, and the local storage device 108. Individual client computing devices 104 are configured to request data from the cloud security server 102, which brokers connections to the cloud service providers 106 and the local storage device 108. Such cloud service providers 106 and the local storage device 108 are sometimes referred to as distributed data sources, or as data sources. On such data access, the cloud security server 102 verifies and enforces the assigned trust levels.

The disclosed system and methods allow the owner of the data to apply a single security model to any number of distinct, distributed data sources. Such single security model may allow for simplified and efficient management of numerous distributed data sources. Also, the disclosed system and methods allow for simplified and efficient access to numerous distributed data sources because, among other features, all such data sources may be accessed through a single centralized cloud security server or cloud security service.

The cloud security server 102 may be embodied as any type of server computing device, or collection of devices, capable of performing the functions described herein. As such, the cloud security server 102 may be embodied as a single server computing device or a collection of servers and associated devices. For example, in some embodiments, the cloud security server 102 is embodied as a cloud security service to perform the functions described herein. In such embodiments, the cloud security server 102 may be embodied as a "virtual server" formed from multiple computing devices distributed across the network 110 and operating in a public or private cloud. Accordingly, although the cloud security server 102 is illustrated in FIG. 1 and described below as embodying a single server computing device, it should be appreciated that the cloud security server 102 may be embodied as multiple devices cooperating together to facilitate the functionality described below.

In the illustrative embodiment of FIG. 1, the cloud security server 102 includes a processor 120, a memory 124, an input/output subsystem 122, a communication circuit 128, and a data storage device 126. Of course, the cloud security server 102 may include other or additional components, such as those commonly found in a computer server (e.g., various input/output devices), in other embodiments. Additionally, in some embodiments, one or more of the illustrative components may be incorporated in, or otherwise from a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the cloud security server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the cloud security server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the cloud security server 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices.

The communication circuit 128 of the cloud security server 102 may be embodied as any communication circuit, device, or collection thereof, capable of enabling communications between the cloud security server 102, the client computing devices 104, the cloud service providers 106, the local storage device 108, and/or other remote devices. The communication circuit 128 may be configured to use any one or more communication technology (e.g., wireless or wired communications) and associated protocols (e.g., Ethernet, Bluetooth®, WiFi®, WiMAX, etc.) to effect such communication.

As discussed in more detail below, the cloud security server 102 is configured to transmit and receive data with the other devices of the system 100 over the network 110. The network 110 may be embodied as any number of various wired and/or wireless networks. For example, the network 110 may be embodied as or otherwise include a wired or wireless local area network (LAN), a wired or wireless wide area network (WAN), and/or a publicly-accessible, global network such as the Internet. As such, the network 110 may include any number of additional devices, such as additional computers, routers, and switches, to facilitate communications between the cloud security server 102 and the other devices of the system 100.

The client computing devices 104 are configured to register with the cloud security server 102, as discussed in more detail below. The client computing devices 104 are further configured to access data from the cloud service providers 106 and/or the local storage device 108, using the cloud security server 102. Each of the client computing devices 104 may be owned or controlled by the owner of the shared data or may be owned or controlled by another entity. For example, the owner of the shared data may register a client computing device 104 of a family member, friend, coworker, or other entity with the cloud security server 102, in order to grant access to shared data.

The client computing devices 104 may be embodied as any type of computer, mobile device, smart phone, or similar computing device capable of performing the functions described herein. Illustratively, each client computing device 104 includes a processor 130, an I/O subsystem 132, a memory 134, a data storage 136, a communication circuitry 138, and/or other components and devices commonly found in a computer, smart phone, or similar computing device. Those individual components of the client computing devices 104 may be similar to the corresponding components of the cloud security server 102, the description of which is applicable to the corresponding components the client computing devices 104 and is not repeated herein so as not to obscure the present disclosure. Further, although the illustrative system 100 of FIG. 1 includes three client computing devices 104, it should be understood that any number of client computing devices 104 may register with the cloud security server 102 and access distributed data sources.

The cloud service providers 106 are configured to provide distributed data storage and delivery, as discussed in more detail below. The cloud service providers 106 have access to distributed data 140, which may be stored in data storage of the respective cloud service provider 106 or may be accessible over a network. Each cloud service provider 106 may provide distinct distributed data 140, or such distributed data 140 may be replicated across some or all of the cloud service providers 106. The cloud service providers 106 may be embodied as any type of data server (e.g., a web server) or similar computing device capable of performing the functions described herein. As such, the cloud service providers 106 may include components and features similar to the cloud security server 102, such as a processor, I/O subsystem, memory, data storage, communication circuitry, and various peripheral devices, which are not illustrated in FIG. 1 for clarity of the present description. Further, although the illustrative system 100 of FIG. 1 includes three cloud service providers 106, it should be understood that any number of cloud service providers 106 may store and deliver distributed data 140.

The local storage device 108 provides storage and access to locally-stored distributed data 140. In some embodiments, the local storage device 108 may be embodied as a physical storage device such as a memory card, flash drive, hard drive, external hard drive, or the like accessible to a client computing device 104. In some embodiments, the local storage device 108 may be included in the data storage 126 of a client computing device 104. In other embodiments, the local storage device 108 may be a standalone device accessible over a local network by a client computing device 104, such as a network attached storage device or a local file server. Again, although the illustrative system 100 of FIG. 1 includes a single local storage device 108, it should be understood that any number of local storage devices 108 may store distributed data 140.

Figure 2:
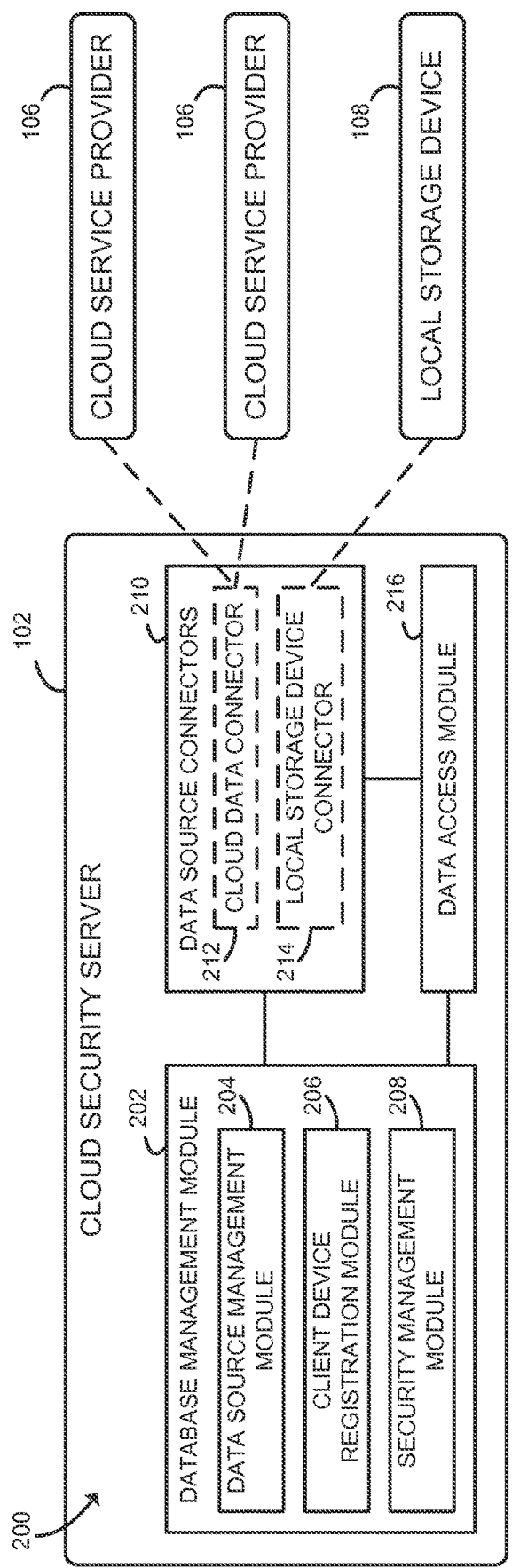
FIG. 2 is a simplified block diagram of at least one embodiment of an environment of a cloud security server of the system of FIG. 1.

Referring now to FIG. 2, in one embodiment, the cloud security server 102 establishes an environment 200 during operation. The illustrative environment 200 includes a database management module 202, at least one data source connector 210, and a data access module 216. The various modules of the environment 200 may be embodied as hardware, firmware, software, or a combination thereof.

The database management module 202 is configured to manage data sources associated with the cloud security server 102, to register client computing devices 104 associated with the cloud security server 102, and to configure and assign security levels to the data sources and client computing devices. In some embodiments, those functions may be performed by sub-modules, for example, by a data source management module 204, a client device registration module 206, and a security management module 208.

The data source connectors 210 are configured to provide standardized or abstracted access to different distributed data sources. In some embodiments, the data source connectors 210 may include a cloud data connector 212. The cloud data connector 212 provides access to the cloud service providers 106. For example, the cloud data connector 212 may store login information required by the cloud service providers 106 such as user credentials. The cloud data connector 212 may also be configured with a communications protocol for communicating with the cloud service providers 106. In some embodiments, the data source connectors 210 may also include a local storage device connector 214. The local storage device connector 214 provides access to the local storage device 108 in a similar fashion as the cloud data connector 212 provides access to the could service providers 106 (e.g., the connector 214 may store login information and/or communication protocols).

The data access module 216 is configured to receive requests for data from client computing devices 104. In response to a request, the data access module 216 authenticates the client computing device 104 and verifies that the client computing device 104 should be granted access to the requested data. If verified, the data access module 216 brokers a connection between the client computing device 104 and the data source containing the requested data, using an associated data source connector 210.

In some embodiments, a user of the cloud security server 102 may export management data from the database management module 202. Such data may provide real-time analysis of devices, identify the individuals access data owned by the user, identify the type of data that has been accessed, identify the amount of data that has been accessed, and/or other data metrics.

Figure 3:
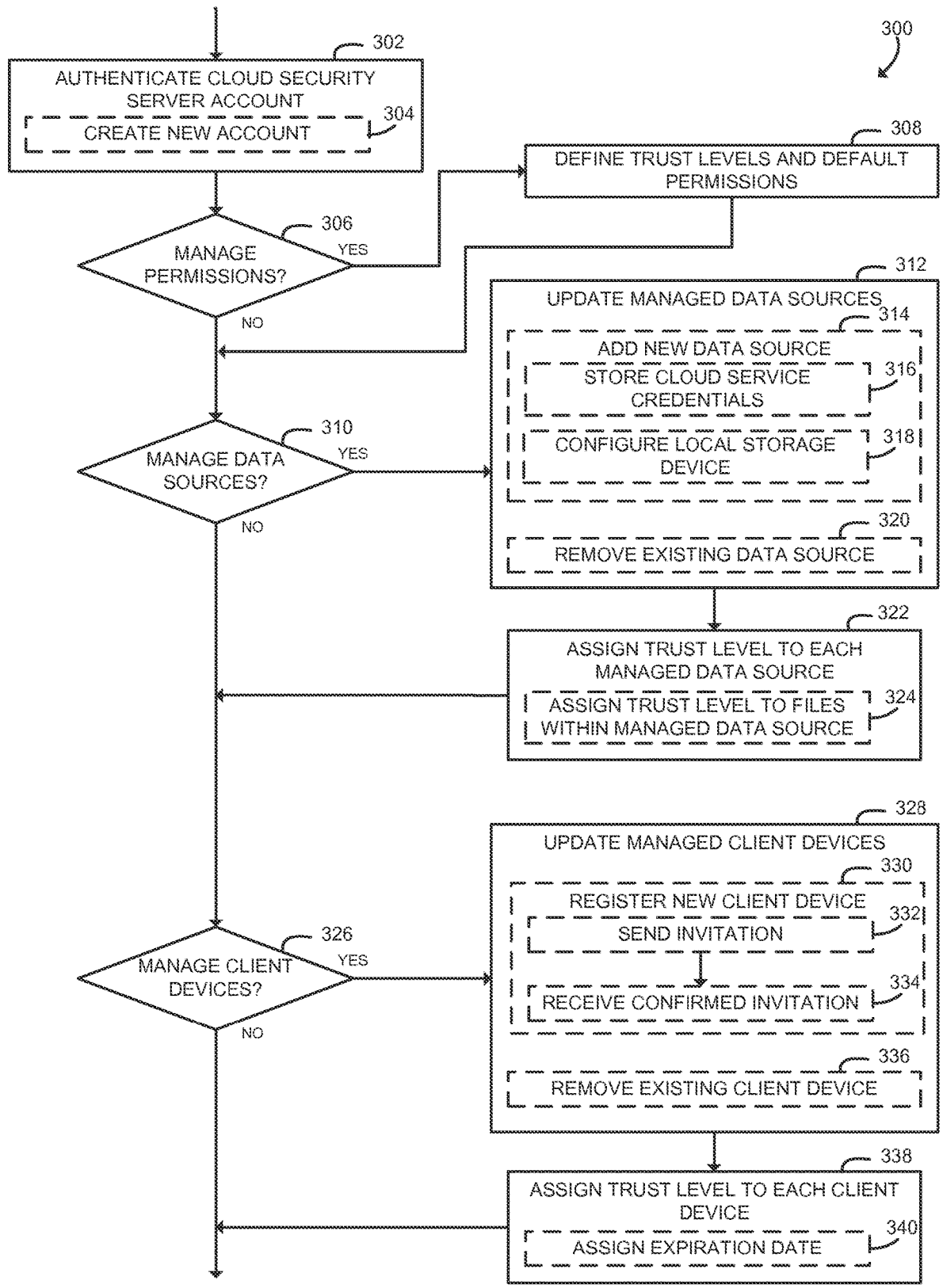
FIG. 3 is a simplified flow diagram of at least one embodiment of a method for managing access to distributed data sources that may be executed by the cloud security server of FIGS. 1 and 2.
Figure 4:
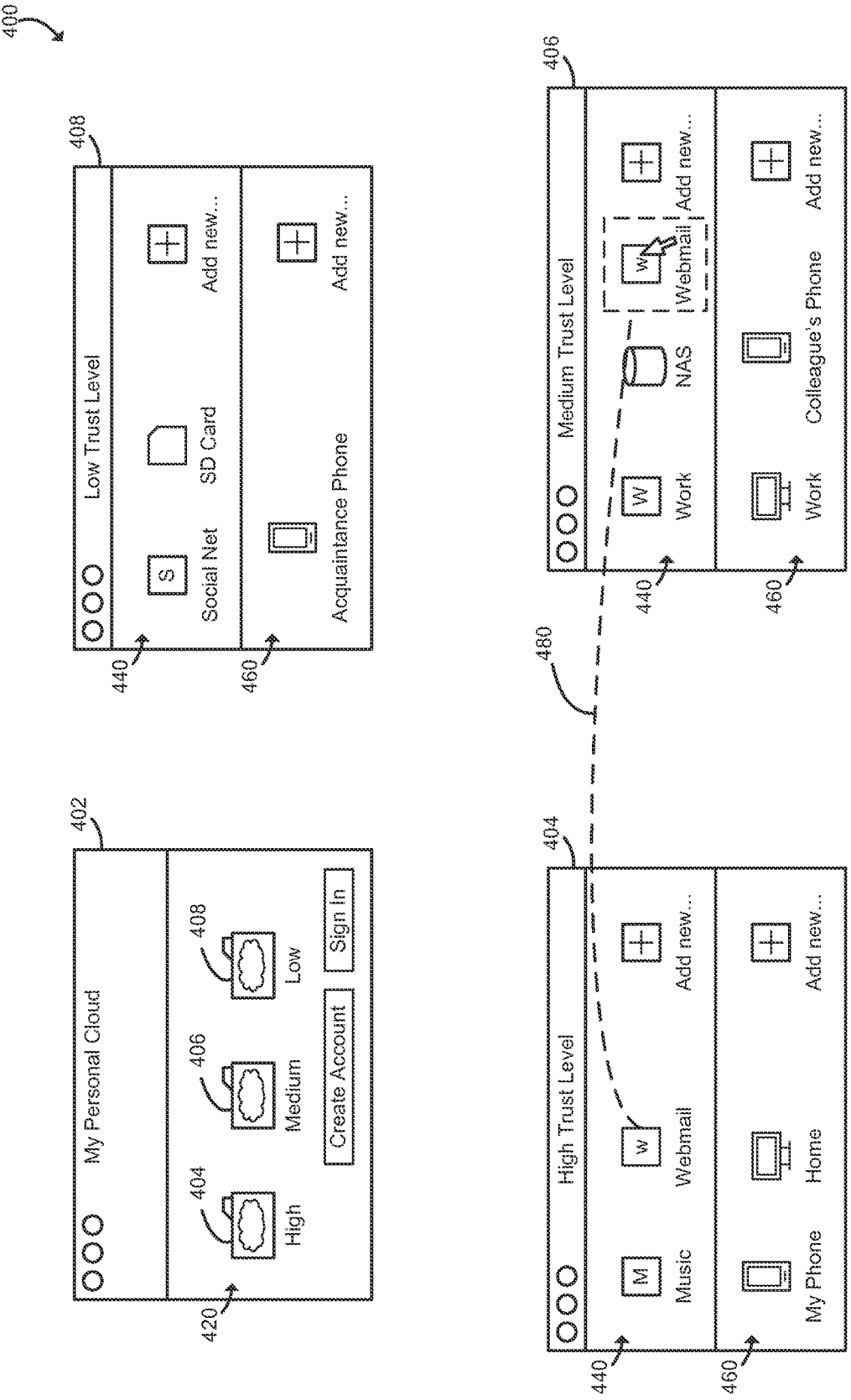
FIG. 4 is a simplified illustration of at least one embodiment of a user interface for the method of FIG. 3.

Referring now to FIG. 3, in use, the cloud security server 102 may execute a method 300 for managing access to distributed data sources. The method 300 begins with block 302, in which the database management module 202 authenticates a cloud security server account. In block 304, the database management module 202 may create a new cloud security server account. The cloud security server account may be associated with a particular user of the cloud security server 102. The cloud security server account provides a single logical connection point for distributed data sources, authorized client devices, and assigned trust levels. The cloud security server account may be authenticated based on credentials supplied by the user of the cloud security server 102, such as a password or a cryptographic certificate. The user may interact with the database management module 202 through an interface on a local console of the cloud security server 102, or through a remote interface such as a web application. Such interaction by the user may also be employed for the other steps of the method 300. For example, referring to FIG. 4, illustration 400 illustrates one potential embodiment of a management interface associated with the method 300 and is discussed in more detail below.

Referring back to FIG. 3, in block 306, the cloud security server 102 determines whether to manage default permissions. The determination of whether to manage default permissions may depend on input received from the user of the cloud security server 102 (e.g., a selection to manage permissions receive from the user). If managing default permissions, the method 300 branches to block 308. In block 308, the database management module 202 defines trust levels and default permissions for the trust levels. For example, in the illustrative embodiment, the database management module 202 may establish three trust levels: high, medium, and low. For example, referring to FIG. 4, window 402 contains icons 420 associated with the defined trust levels, which icons may be added, deleted, and renamed in a customary way. Of course, although three trust levels are shown in the figures and described herein, it should be appreciated that fewer or more trust levels may be used in other embodiments to increase the granularity of trust and/or manage data access accordingly. Referring back to FIG. 3, after trust levels and default permissions have been established in block 308 or if management of permissions is not requested, method 300 advances to block 310.

In block 310, the cloud security server 102 determines whether the user desires to manage data sources. Again, whether to manage data sources may depend on input received from the user. If managing data sources, the method 300 branches to block 312 in which the database management module 202 updates the data sources associated with the cloud security server account. For example if the user desires to add a data source, in block 314, the database management module 202 may add a new data source. New data sources are added by configuring a data source connector 210 to allow access to the data source, for example by providing login information. In block 316, the database management module 202 may configure a data source connector 210 to allow access to a cloud service provider 106. To provide such access, the database management module 202 may store credentials associated with the cloud service provider 106, such as a username and password combination, and any required communication information (e.g., the IP address of the associated cloud service provider 106). Additionally, in block 318, the database management module 202 may configure a data source connector 210 to provide access to a local storage device 108, for example by storing a local network path or required access credentials. Additionally, if the user desires to delete or remove connection to a particular data source, the database management module 202 may remove an existing data source in block 320 based on selection by the user. After such removal, the data source is disassociated with the cloud security server account and is no longer accessible through the cloud security server 102. Such removal and disassociation does not affect the data itself.

In block 322, the database management module 202 assigns a trust level to each data source as specified by the user. A trust level may be newly assigned to each newly added data source, or the trust level assigned to an existing data source may be modified. By default, the assigned trust level applies to all data maintained in the data source. In block 324, the database management module 202 may assign a trust level to an individual file or other item of data within the data source. For example, referring to FIG. 4, windows 404, 406, and 408 illustrate three trust levels (high, medium, and low) associated with the cloud security server account. Icons 440 of the windows 404, 406, and 408 illustrate data sources associated with each trust level. Such data sources may be managed by adding and deleting icons in a customary way, or by moving icons from window to window, as illustrated by drag-and-drop trace 480. Referring back to FIG. 3, after the data sources and trust levels have been managed in blocks 312 and 322 or if no management of data sources is requested, the method 300 advances to block 326.

In block 326, the cloud security server 102 determines whether the user desires to manage client devices. Again, whether to manage client devices may depend on input received from the user. If managing client devices, the method 300 branches to block 328 in which the database management module 202 updates the client computing devices 104 associated with the cloud security server account. Note that each client computing devices 104 may be owned or controlled by the user of the cloud security server 102 or by another entity. In block 330, the database management module 202 may register a new client computing device 104 based on a request received from the user. To do so, in block 332, in some embodiments the database management module 202 may send an invitation to the new client computing device. The invitation may be embodied as an email message or a text message. In block 334, in some embodiments the database management module 202 may receive a confirmation of the invitation from the client computing device 104. Such confirmation is sent by the client computing device 104 and indicates that the user of the client computing device 104 has accepted the invitation, for example by clicking a link in the invitation. In some embodiments, the confirmation may include a secret provided by the client computing device 104, such as a password provided by the user of the client computing device 104. Such secret may provide an additional out-of-band security measure. Additionally, if the user desires to delete or remove access by a particular data client device, the database management module 202 may remove an existing client computing device 104 in block 336. After such removal, the client computing device 104 is disassociated with the cloud security server account and may no longer access the cloud security server 102.

In block 338, the database management module 202 assigns a trust level to each associated client computing device 104 as specified by the user. A trust level may be newly assigned to each newly added client computing device 104, or the trust level assigned to an existing client computing device 104 may be modified. The assigned trust level of the client computing device 104 corresponds to data sources available through the cloud security server 102. The assigned trust level is used to control access to the data sources, described below in connection with FIGS. 5 and 6. In block 340, in some embodiments, the database management module 202 may assign an expiration date specified by the user to the assigned trust level. Thus, the access granted to the client computing device 104 may automatically expire at the expiration date. For example, referring to FIG. 4, icons 460 of the windows 404, 406, and 408 represent client computing devices 104 associated with the cloud security server account. The client computing devices 104 and their associated security levels may be managed through manipulating the icons 460 in a customary way.

Although listed in the illustrated embodiment in a particular order, blocks 306, 310, and 326 may be executed in any order or contemporaneously with each other. Additionally, the method 300 as a whole may be executed upon request by the user. Thus, the permissions, data sources, and client devices managed by the cloud security server 102 may be updated as requested by the user.

Figure 5:
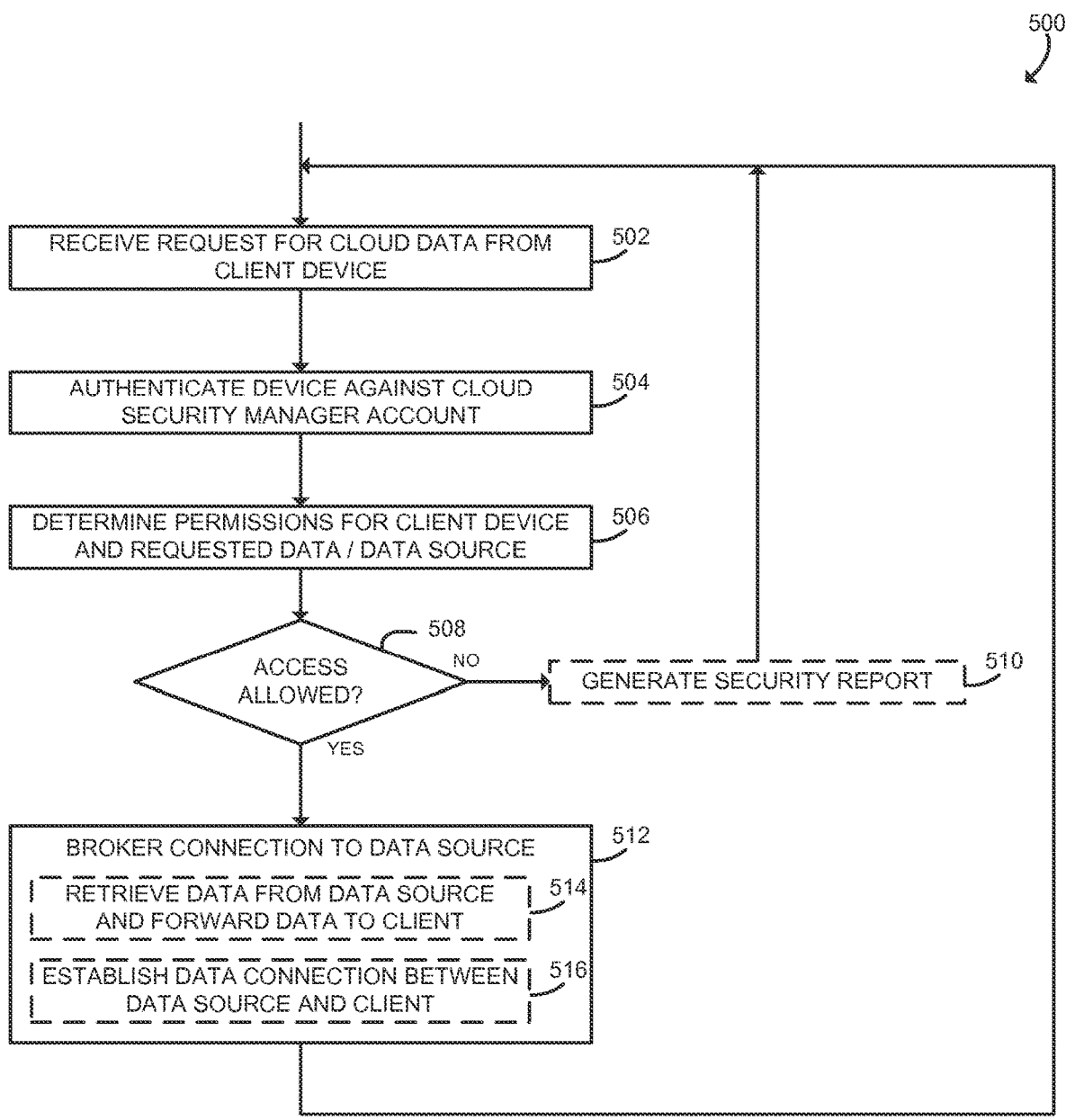
FIG. 5 is a simplified flow diagram of at least one embodiment of a method for providing access to distributed data sources that may be executed by the cloud security server of FIGS. 1 and 2.

Referring now to FIG. 5, in use, the cloud security server 102 may execute a method 500 to provide access to distributed data sources. The method 500 begins with block 502, in which the data access module 216 receives a request from a client computing device 104 for cloud data. As discussed above, multiple client computing devices 104 may be associated with the cloud security server 102.

In block 504, the data access module 216 authenticates the client computing device 104 to a cloud security server account. Authenticating the client computing device 104 to an account verifies that the client computing device 104 sending the request is the same client computing device 104 that previously registered with the cloud security server 102. Thus, authentication links the client computing device 104 sending the request with available data sources and security levels. To authenticate against the cloud security server account, the data access module 216 may receive credentials from the client computing device 104. Such credentials may correspond to the credentials established in block 304 of FIG. 3.

In block 506, the data access module 216 determines permissions for the client computing device 104 and the requested data and/or data source. To do so, the data access module 216 may consult the database management module 202 to determine the assigned trust level for the client computing device 104 and the assigned trust level for the requested data. As stated above, the trust level assigned to the data source may apply to all data contained in the data source, or individual data items of the data source may be assigned individual trust levels.

In block 508, the data access module 216 determines whether to allow the client computing device 104 to access to the requested data. To make such determination, the data access module 216 may compare the trust level assigned to the client computing device 104 and the trust level assigned to the requested data. In some embodiments, the data access module 216 may allow access when the trust levels are equal. In other embodiments, the trust levels may be hierarchical or otherwise ordered, and the data access module 216 may allow access if the trust level of the client computing device 104 exceeds the trust level of the requested data. For example, given three ordered trust levels high, medium, and low, the data access module 216 may allow a client computing device 104 assigned trust level medium to access requested data assigned trust levels medium or low.

If the data access module 216 determines not to allow access, the method 500 advances to block 510. In block 510, in some embodiments, the data access module 216 may generate a security report containing information on the denied request. Such security report may be made available to the user of the cloud security server 102 by, for example, emailing the report to the user, or allowing the report to be viewed by the user when managing the cloud security server 102. After block 510, the method 500 loops back to block 502, to await further requests from client computing devices 104.

Referring back to block 508, if the data access module 216 allows access, the method 500 advances to block 512. In block 512, the data access module 216 brokers access to the data source of the requested data. To perform such brokering, the data access module 216 uses a data source connector 210. As discussed above in connection with FIG. 4 block 312, such data source connector 210 may have been configured for access to the data source. In block 514, in some embodiments the data source connector 210 retrieves the requested data from the data source and forwards the retrieved data to the client computing device 104. In some embodiments, the data source connector 210 may retrieve the data by connecting to a cloud service provider 106 using stored credentials, as discussed above. In other embodiments, the data source connector 210 may retrieve the data from a local storage device 108, as discussed above. In block 516, in some embodiments, the data source connector 210 may establish a data connection between the data source and the client computing device 104. For example, the data source connector 210 may use stored credentials to establish a direct data connection between the client computing device 104 and a cloud service provider 106 or a local storage device 108. Alternatively, the data source connector 210 may direct the client computing device 104 to connect to the appropriate data source. After block 512, the method 500 loops back to block 502 to await further requests from client computing devices 104.

Figure 6:
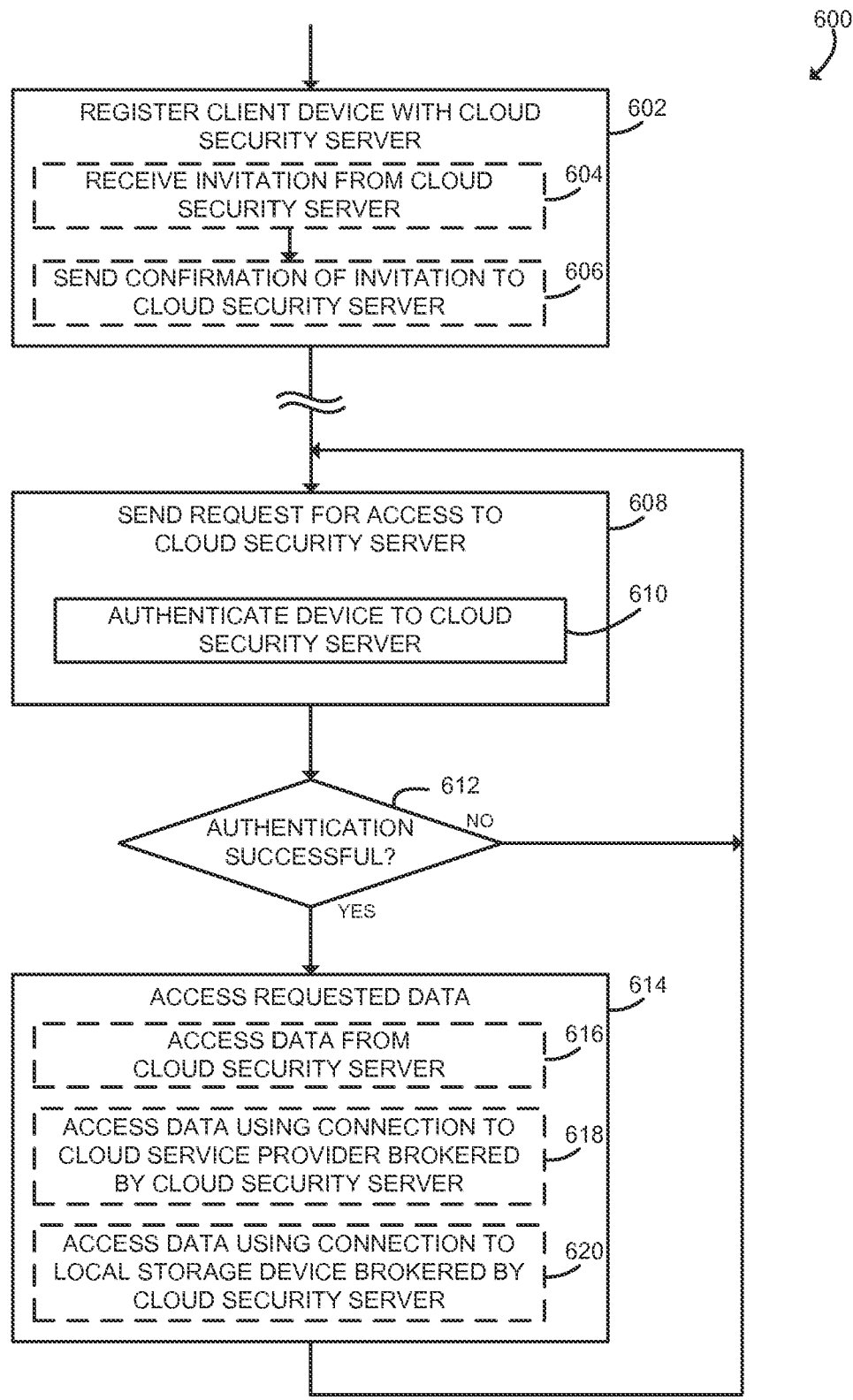
FIG. 6 is a simplified flow diagram of at least one embodiment of a method for gaining access to distributed data sources that may be executed by a client computing device of FIG. 1.

Referring now to FIG. 6, in use, a client computing device 104 may execute a method 600 to access data through the cloud security server 102. The method 600 begins with block 602, in which the client computing device 104 registers with the cloud security server 102. As discussed above, the client computing device 104 may be owned or controlled by the user of the cloud security server 102 or by another entity; therefore, the client computing device 104 must be registered with the cloud security server 102 in order be allowed access to data. In block 604, in some embodiments the client computing device 104 may receive an invitation from the cloud security server 102. As discussed above in connection with block 332 of FIG. 3, the invitation may be embodied as an email message or a text message. In block 606, in some embodiments the client computing device 104 may send a confirmation of the invitation to the cloud security server 102. As discussed above in connection with block 334 of FIG. 3, the client computing device 104 may send such confirmation upon the user of the client computing device 104 accepting the invitation, for example, by clicking a link in the invitation. As discussed above, such confirmation may include a secret, for example, a password provided by the user of the client computing device 104.

After some time, in block 608, the client computing device 104 may send a request for access to the cloud security server 102. The request for access may be generated by a specialized data access application of the client computing device 104 configured to access the cloud security server 102. In other embodiments, such request may be generated through ordinary data access, similar to directly accessing a cloud service provider 106 or a local storage device 108. As part of the request for access, the client computing device 104 authenticates itself to the cloud security server 102. As discussed above in connection with block 504 of FIG. 5, the client computing device 104 may provide credentials to the cloud security server 102 associated with a cloud security server account. As discussed above in connection with block 506 of FIG. 5, the cloud security server 102 also verifies that the assigned trust level of the client computing device 104 allows access to the requested data. In block 612, the client computing device 104 determines whether authentication was successful. If not successful, the method 600 loops back to block 608 and may request additional data. If successful, the method 600 advances to block 614.

In block 614, the client computing device 104 accesses the requested data. In some embodiments, data access may be performed by a specialized data access application of the client computing device 104. In other embodiments, data access may be performed in the same manner as for a cloud service provider 106 or a local storage device 108, as through a web browser or a file browser. In some embodiments and for some data sources, the client computing device 104 may access the requested data from the cloud security server 102 itself in block 616. For example, such data may be transmitted to the client computing device 104 directly from the cloud security server 102. In block 618, in some embodiments the client computing device 104 may access data using a connection to a cloud service provider 106 brokered by the cloud security server 102. The cloud security server 102 may broker such connections, for example, by providing appropriate credentials to the cloud service provider 106. In block 620, in some embodiments the client computing device 104 may access data using a connection to a local storage device 108 brokered by the cloud security server 102. The cloud security server 102 may broker such connections, for example, by providing appropriate credentials to a local storage device 108 accessible to the client computing device 104 on a network. Further, in some embodiments, the data stored on the local storage device 108 (or other data source) may instead be imported, in real time, to the cloud security server 102 and/or one of the cloud service providers 106 in response to the request for data. Such real-time importing of data may allow the user to make real-time decisions on whether to allow or deny access to such data. Following block 614 the method 600 loops back to block 608 and may request additional data.

Examples

Illustrative examples of the devices and methods disclosed herein are provided below. An embodiment of the devices and methods may include any one or more, and any combination of, the examples described below.

Example 1 includes a cloud security server having a database management module to: (i) associate a data source with a user account, (ii) assign one of a plurality of trust levels to data stored on the data source, (iii) associate a client device with the user account, and (iv) assign one of the plurality of trust levels to the client device; a data source connector to broker access to data of the data source; and a data access module to (i) receive a request from the client device for access to requested data of the data source and (ii) authenticate the client device in response to receiving the request; wherein (i) the database management module is further to verify the request by verifying the assigned trust level of the client device has a predefined relationship with the assigned trust level of the requested data, and (ii) the data access module is further to broker access to the requested data by the client device using the data source connector in response to the database management module verifying the request.

Example 2 includes the subject matter of Example 1, and wherein the database management module is to verify the request by verifying the assigned trust level of the client device is at least the assigned trust level of the data source.

Example 3 includes the subject matter of any of Examples 1 and 2, and wherein the database management module is to assign one of a plurality of trust levels to the data stored on the data source by assigning one of the plurality of trust levels to an item of data stored on the data source.

Example 4 includes the subject matter of any of Examples 1-3, and wherein the database management module is to assign one of a plurality of trust levels to the data stored on the data source by assigning one of the plurality of trust levels to all data stored on the data source.

Example 5 includes the subject matter of any of Examples 1-4, and wherein the data source connector is to broker access to data of the data source using credentials to allow access to the data source; and the database management module is to associate a data source with a user account by configuring the data source connector with the credentials.

Example 6 includes the subject matter of any of Examples 1-5, and wherein the data source connector is to broker access to a local storage device; and the database management module is to associate a data source with a user account by configuring the data connector to allow access to the local storage device.

Example 7 includes the subject matter of any of Examples 1-6, and wherein the database management module is to associate the client device with the user account by sending an invitation to the client device; and receiving a confirmation from the client device that indicates a user of the client device has accepted the invitation.

Example 8 includes the subject matter of any of Examples 1-7, and wherein the database management module is to send the invitation by one of: email and text message.

Example 9 includes the subject matter of any of Examples 1-8, and wherein the database management module is to receive the confirmation by verifying a secret received from the client device.

Example 10 includes the subject matter of any of Examples 1-9, and wherein the database management module is further to assign an expiration date to the assigned trust level of the client device; and verify the assigned trust level of the client device by verifying the assigned trust level as a function of the expiration date.

Example 11 includes the subject matter of any of Examples 1-10, and wherein the database management module is further to disassociate the client device and the user account; and deny access to the data source by the client device in response to disassociating the client device.

Example 12 includes the subject matter of any of Examples 1-11, and wherein the data access module is to broker access to the requested data by (i) retrieving the requested data from the data source and (ii) forwarding the requested data to the client device.

Example 13 includes the subject matter of any of Examples 1-12, and wherein the data access module is to broker access to the requested data by establishing a direct connection between the data source and the client device.

Example 14 includes the subject matter of any of Examples 1-12, and wherein the database management module is to generate management data as a function of the accesses to the data stored on the data source and transmit the management data to the client device in response to receiving a request for the management data.

Example 15 includes the subject matter of any of Examples 1-14, and wherein the management data comprises data that identifies one of: the individuals that have accessed the data stored on the data source, the type of data that has been accessed, and the amount of data that has been accessed.

Example 16 includes the subject matter of any of Examples 1-15, and wherein the database access module is to import data directly from the data source in real-time in response to the database management module verifying the request and an authorization to import the data received from an owner of the data.

Example 17 includes a method to manage cloud data access on a cloud security server. The method includes associating, on the cloud security server, a data source with a user account; assigning, on the cloud security server, one of a plurality of trust levels to data stored on the data source; associating, on the cloud security server, a client device with the user account; assigning, on the cloud security server, one of the plurality of trust levels to the client device; receiving, on the cloud security server, a request from the client device for access to requested data of the data source; authenticating, on the cloud security server, the client device in response to receiving the request; verifying, on the cloud security server, the request by verifying the assigned trust level of the client device has a predefined relationship with the assigned trust level of the requested data in response to authenticating the client device; and brokering, on the cloud security server, access to the requested data by the client device in response to verifying the request.

Example 18 includes the subject matter of Example 17, and wherein verifying the assigned trust level of the client device has the predefined relationship with the assigned trust level of the requested data comprises verifying the assigned trust level of the client device is at least equal to the assigned trust level of the requested data.

Example 19 includes the subject matter of any of Examples 17 and 18, and wherein assigning one of the plurality of trust levels to the data stored on the data source comprises assigning one of the plurality of trust levels to an item of data stored on the data source.

Example 20 includes the subject matter of any of Examples 17-19, and wherein assigning one of the plurality of trust levels to the data stored on the data source comprises one of the plurality of trust levels to all data stored on the data source.

Example 21 includes the subject matter of any of Examples 17-20, and wherein associating the data source with the user account comprises configuring, on the cloud security server, login information with credentials to allow access to the data source.

Example 22 includes the subject matter of any of Examples 17-21, and wherein associating the data source with the user account comprises configuring, on the cloud security server, login information to allow access to a local storage device.

Example 23 includes the subject matter of any of Examples 17-22, and wherein associating the client device with the user account comprises sending an invitation from the cloud security server to the client device; and receiving, on the cloud security server, a confirmation from the client device that indicates a user of the client device has accepted the invitation.

Example 24 includes the subject matter of any of Examples 17-23, and wherein sending the invitation comprises one of: sending the invitation by email and sending the invitation by text message.

Example 25 includes the subject matter of any of Examples 17-24, and wherein receiving the confirmation from the client device comprises verifying a secret received from the client device.

Example 26 includes the subject matter of any of Examples 17-25, and wherein assigning one of the plurality of trust levels to the client device comprises assigning an expiration date to the assigned trust level of the client device; and verifying the assigned trust level of the client device further comprises verifying the assigned trust level of the client device as a function of the expiration date.

Example 27 includes the subject matter of any of Examples 17-26, and further including disassociating, on the cloud security server, the client device and the user account; and denying, on the cloud security server, access to the data source by the client device in response to disassociating the client device.

Example 28 includes the subject matter of any of Examples 17-27, and wherein brokering access to the requested data comprises retrieving, on the cloud security server, the requested data from the data source; and forwarding the requested data from the cloud security server to the client device.

Example 29 includes the subject matter of any of Examples 17-28, and wherein brokering access to the requested data comprises establishing a direct connection between the data source and the client device.

Example 30 includes the subject matter of any of Examples 17-29, and further including generating management data as a function of the accesses to the data stored on the data source and transmit the management data to the client device in response to receiving a request for the management data.

Example 31 includes the subject matter of any of Examples 17-30, and further including importing data directly from the data source in real-time in response to the database management module verifying the request and an authorization to import the data received from an owner of the data.

Example 32 includes a method for trusted access to cloud data. The method includes receiving an invitation to access data of a data source from the cloud security server on the client device; authenticating the client device to the cloud security server; sending a request from the client device to the cloud security server for access to the data of a data source; and accessing the requested data on the client device as a function of a trust level assigned to the client device and a trust level assigned to the requested data.

Example 33 includes the subject matter of Example 32, and wherein accessing the requested data on the client device as a function of the trust level assigned to the client device and the trust level assigned to the requested data comprises accessing the requested data as a function of the trust level assigned to the client device being at least equal to the trust level assigned to the requested data.

Example 34 includes the subject matter of any of Examples 32 and 33, and wherein receiving the invitation comprises one of: receiving the invitation by email and receiving the invitation by text message.

Example 35 includes the subject matter of any of Examples 32-34, and wherein authenticating the client device comprises sending to the cloud security server a secret entered by the user of the client device.

Example 36 includes the subject matter of any of Examples 32-35, and wherein accessing the requested data comprises receiving the requested data from the cloud security server.

Example 37 includes the subject matter of any of Examples 32-36, and wherein accessing the requested data comprises accessing the requested data on the data source.

Example 38 includes the subject matter of any of Examples 32-37, and wherein accessing the requested data comprises accessing the requested data on the data source.

Example 39 includes a computing device having a processor and a memory having stored therein a plurality of instructions that when executed by the processor cause the computing device to perform the method of any of Examples 17-38.

Example 40 includes one or more machine readable storage media comprising a plurality of instructions stored thereon that in response to being executed result in a computing device performing the method of any of Examples 17-38.

The invention claimed is:

1. A computer-readable storage device or storage disk comprising instructions that, when executed, cause programmable circuitry to at least:
   cause storage of first credentials, the first credentials to enable access by a data distribution service to first data of a first data source;
   cause association of a first user with the data distribution service based on second credentials, the association to provide first access permission to the first user;
   cause activation of first data permission corresponding to the first user at a first time, the first data permission to enable the first user to change the first data; and
   cause deactivation of the first data permission corresponding to the first user at a second time, the deactivated first data permission to disable access by the first user to the first data source, the association of the first user and the data distribution service to be maintained.

2. The computer-readable storage device or storage disk as defined in claim 1, wherein the instructions are to cause the programmable circuitry to:
   detect an icon change; and
   at least one of (a) activate the first data permission or (b) deactivate the first data permission based on a state of the icon change.

3. The computer-readable storage device or storage disk as defined in claim 1, wherein the instructions are to cause the programmable circuitry to obtain requests for the first data from the first user.

4. The computer-readable storage device or storage disk as defined in claim 3, wherein the instructions are to cause the programmable circuitry to obtain the requests from a web browser.

5. The computer-readable storage device or storage disk as defined in claim 1, wherein the instructions are to cause the programmable circuitry to provide the first access permissions to the first user via at least one of a web browser, a file browser, or a download.

6. The computer-readable storage device or storage disk as defined in claim 1, wherein the instructions are to cause the programmable circuitry to enable the first data permission to permit the first data of the first data source to be viewed by the first user.

7. The computer-readable storage device or storage disk as defined in claim 1, wherein the instructions are to cause the programmable circuitry to enable the first data permission to permit the first data of the first data source to be downloaded by the first user.

8. The computer-readable storage device or storage disk as defined in claim 1, wherein the instructions are to cause an invitation to be sent to the first user.

9. The computer-readable storage device or storage disk as defined in claim 8, wherein the invitation includes at least one of an e-mail message or a text message.

10. The computer-readable storage device or storage disk as defined in claim 1, wherein the instructions are to cause the first data permission to be associated with an expiration duration.

11. The computer-readable storage device or storage disk as defined in claim 10, wherein the instructions are to cause the first data permissions to change when the expiration duration is satisfied.

12. The computer-readable storage device or storage disk as defined in claim 1, wherein at least one of the first credentials or the second credentials include a username and a password.

13. The computer-readable storage device or storage disk as defined in claim 1, wherein the instructions are to cause a user interface to be presented to the first user.

14. The computer-readable storage device or storage disk as defined in claim 13, wherein the instructions are to cause icons to be presented in the user interface, respective ones of the icons corresponding to a behavior of the first data permission.

15. A data distribution system, comprising:
memory;
computer readable instructions; and
processor circuitry to execute the computer readable instructions to:
cause authentication a first data source based on first credentials, the first credentials to enable the data distribution device to access first data of the first data source;
cause association of a first user identity with the data distribution system based on second credentials, the association to enable first access permission to the first user identity;
activate a first data permission corresponding to the first user identity at a first time, the first data permission to enable the first user identity to change an access behavior corresponding to the first data; and
deactivate the first data permission corresponding to the first user identity at a second time, the deactivated data permission to disable the access behavior corresponding to the first user identity to the first data source, the first user identity to maintain the association between the first user identity and the data distribution system.

16. The data distribution system as defined in claim 15, wherein the processor circuitry is to detect an icon change, and to, based on a current state of the icon, at least one of (a) activate the first data permission or (b) deactivate the first data permission.

17. The data distribution system as defined in claim 15, wherein the processor circuitry is to retrieve requests from the first user identity via a web browser.

18. The data distribution system as defined in claim 15, wherein the processor circuitry is to enable first user identity access to the first data via at least one of downloading or a web browser.

19. The data distribution system as defined in claim 15, wherein the access behavior includes viewing, the processor circuitry to cause the first data to be viewable by the first user identity.

20. The data distribution system as defined in claim 15, wherein the processor circuitry is to cause an invitation to be sent to the first user identity.

21. The data distribution system as defined in claim 20, wherein the processor circuitry is to cause the invitation to be sent as at least one of an e-mail message or a text message.

22. The data distribution system as defined in claim 15, wherein the processor circuitry is to cause the first data permission to expire after a threshold duration.

23. The data distribution system as defined in claim 15, wherein at least one of the first credentials or the second credentials include a combination of a username and a password.

24. A method to distribute data, comprising:
storing first credentials, the first credentials to enable access by a data distribution service to first data of a first data source;
associating a first user with the data distribution service based on second credentials, the association to provide first access permission to the first user;
activating a first data permission corresponding to the first user at a first time, the first data permission to enable the first user to change the first data; and
deactivating the first data permission corresponding to the first user at a second time, the deactivated first data permission to disable access by the first user to the first data source, the association of the first user and the data distribution service to be maintained.

25. The method as defined in claim 24, further including at least one of (a) activating the first data permission or (b) deactivating the first data permission based on detecting an icon change.

26. The method as defined in claim 24, further including sending an invitation to the first user identity, the invitation sent as at least one of an e-mail message or a text message.

* * * * *